L. P. WEABER, Jr.

MILLSTONE DRIVER.

No. 10,118. Reissued May 16, 1882.

Witnesses.
Wm. W. Mortimer,
J. C. McKeever.

Inventor
L. P. Weaber, Jr.
per
F. A. Lehmann,
Atty.

N. PETERS. Photo-Lithographer. Washington, D. C.

UNITED STATES PATENT OFFICE.

LEWIS P. WEABER, JR., OF NEW HARMONY, INDIANA.

MILLSTONE-DRIVER.

SPECIFICATION forming part of Reissued Letters Patent No. 10,118, dated May 16, 1882.

Original No. 252,557, dated January 17, 1882. Application for reissue filed April 12, 1882.

*To all whom it may concern:*

Be it known that I, LEWIS P. WEABER, Jr., a citizen of the United States, residing at New Harmony, in the county of Posey and State of Indiana, have invented certain new and useful Improvements in Millstone-Drivers, of which the following is a specification, reference being had therein to the accompanying drawings.

My invention relates to an improvement in millstone-drivers; and it consists in the combination of a ring or band which is passed over the spindle, and which is provided with two dowel-pins to fit in the top plate, with a driver which is made in two parts, and which parts are pivoted between the two parts of the frame, as will be more fully described hereinafter.

The object of my invention is to make a cheap, simple, and efficient driver for millstones, and one which is so constructed that the slightest movement of one part of the driver will react upon the other, and thus keep the stones even and true.

Figure 1:
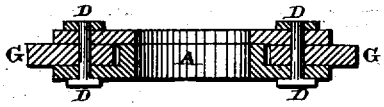
Figure 2:
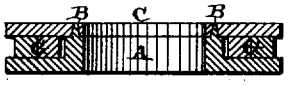
Figure 3:
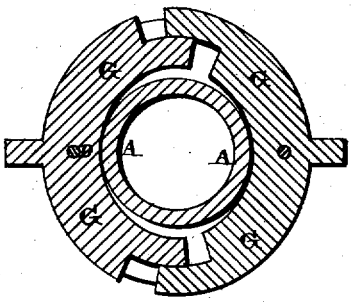

Figures 1 and 2 are vertical cross-sections of my invention, taken at right angles to each other, and Fig. 3 is a horizontal section of the same.

A represents a ring or band which is passed down over the spindle, and which is provided with two tapering dowel-pins, B, upon its top edge for the purpose of catching in corresponding recesses made in the top plate, C, for the purpose of holding the ring and the plate securely together. This ring is made L-shaped in cross-section at its edges, as shown in Figs. 1 and 2, and passing up through the top plate and the horizontal flange, which extends outward from the lower edge of the ring, are the two pivotal bolts D, upon which the two parts of the driver G turn. This driver is made in two parts, of the form shown in Fig. 3, and each one has its inner end so shaped as to bear against the sides of the ends of the other part. As thus held, the two parts of the driver are placed between the top plate and the ring or band and have a free limited lateral movement upon their pivots. The slightest movement of either part is at once transferred to the opposite part, and this reflex action serves to keep the stone always even and true.

Having thus described my invention, I claim—

The combination of the L-shaped ring or band A, provided with the dowel-pins B, the top plate, C, the pivotal bolts D, and the driver G, made in two parts and having their ends bear against each other, so that the slightest movement of one part will react upon the other, substantially as described.

In testimony whereof I affix my signature in presence of two witnesses.

LEWIS P. WEABER, JR.

Witnesses:

GEORGE A. HUNSDON,

HENRY HUNSDON.